United States Patent [19]

Okamoto

[11] Patent Number: 5,692,018
[45] Date of Patent: Nov. 25, 1997

[54] TIME-DIVERSITY INTERFERENCE CANCELER WITH ADD/SUBTRACT/SELECT CIRCUIT RESPONSIVE TO DECISION ERROR

[75] Inventor: Shingo Okamoto, Tokyo, Japan

[73] Assignee: NEC Corporation, Japan

[21] Appl. No.: 630,527

[22] Filed: Apr. 10, 1996

[30] Foreign Application Priority Data

Apr. 11, 1995  [JP]  Japan ..................... 7-085368

[51] Int. Cl.[6] .................. H04B 7/08; H04L 27/22
[52] U.S. Cl. .................. 375/347; 375/233; 455/133; 455/278.1
[58] Field of Search .................. 375/233, 235, 375/267, 346, 347, 348, 349; 370/206, 286, 289, 290; 455/133, 275, 278.1, 296; 379/410, 411

[56] References Cited

U.S. PATENT DOCUMENTS

| | | | |
|---|---|---|---|
| 4,281,411 | 7/1981 | Bonn et al. | 375/232 |
| 4,328,585 | 5/1982 | Monsen | 375/347 X |
| 5,285,482 | 2/1994 | Sehier et al. | 375/355 |
| 5,335,251 | 8/1994 | Onishi et al. | 375/347 |
| 5,349,609 | 9/1994 | Tsujimoto | 375/347 |
| 5,398,259 | 3/1995 | Tsujimoto | 375/233 |
| 5,424,023 | 6/1995 | Tsujimoto | 375/347 |
| 5,424,125 | 6/1995 | Tsujimoto | 375/347 |
| 5,425,059 | 6/1995 | Tsujimto | 375/347 |

OTHER PUBLICATIONS

Li, M. et al., "Rejection of CW Interference in QPSK Systems Using Decision-Feedback Filters", *IEEE Transactions on Communications*, vol. COM-31, No. 4, Apr. 1983, pp. 473–483.

Primary Examiner—Young T. Tse
Attorney, Agent, or Firm—Ostrolenk, Faber, Gerb & Soffen, LLP

[57] ABSTRACT

An interference canceler comprises a first complex multiplier for multiplying a signal recovered from a quadrature modulated carrier by a first correlation value, and a second complex multiplier for multiplying a delayed version of the recovered signal by a second correlation value. The outputs of the multipliers are additively combined in an adder and subtractively combined in a subtractor. The output of the adder is amplified by an AGC amplifier to produce a reference signal representative of the envelope of the adder output. First correlation between the recovered signal and the reference signal is detected and the first correlation value is derived therefrom and second correlation is detected between the delayed version of the recovered signal and the reference signal and the second correlation value is derived therefrom. One of the outputs of the amplifier and the subtractor is selected by a selector. A decision feedback equalizer operates on the output of the selector to produce a decision output and a decision error. The decision error is compared with a threshold value and the selector is controlled depending on whether the decision error is higher or lower than the threshold value.

4 Claims, 2 Drawing Sheets

TIME-DIVERSITY INTERFERENCE CANCELER WITH ADD/SUBTRACT/SELECT CIRCUIT RESPONSIVE TO DECISION ERROR

BACKGROUND OF THE INVENTION

1. Field of the Invention

The present invention relates generally to interference cancelers, and more specifically to an interference canceler using a decision feedback equalizer particularly suitable for applications where the level of narrowband CW (continuous wave) interference is higher than the level of desired signal.

2. Description of the Related Art

Rejection of CW interference using a decision feedback equalizer is described in an article "Rejection of CW Interference in QPSK Systems Using Decision-Feedback Filters", Loh-Ming Li and Laurence B. Milstein, IEEE Transactions on Communications, Vol. COM-31, No. 4, April, 1983. The decision feedback equalizer described in this article has a forward filter whose reference tap is located at the center of its tapped delay line for canceling narrowband CW interference using the MMSE (minimum mean square error) algorithm. The backward filter of the equalizer operates to compensate for the spectral notch created in the desired signal by the forward filter as a result of its interference cancellation.

However, it is known that the power of the MMSE algorithm for rejecting CW interference has an inherent limit which is −5 dB in terms of desired-to-undesired (D/U) ratio. If the interference canceler were to operate beyond this limit, the control would diverge. If a diversity receiver were to be implemented with a decision feedback equalizer, the number of delay-line taps used in the equalizer would be substantial, resulting in a convergence delay.

SUMMARY OF THE INVENTION

It is therefore an object of the present invention to provide an interference canceler capable of rejecting interference even when the level of interference is higher than the level of desired signal.

According to a first aspect of the present invention, there is provided an interference canceler comprising a first time-diversity branch formed by a complex multiplier for multiplying a signal recovered from a quadrature modulated carrier by a first correlation value, and a second time-diversity branch formed by a series circuit of a delay element and a complex multiplier for producing a delayed version of the recovered signal and multiplying it by a second correlation value. The outputs of the first and second time-diversity branches are additively combined in an adder and subtractively combined in a subtractor. The output of the adder is amplified by an AGC amplifier to produce a reference signal representative of the envelope of the adder output. First correlation between the recovered signal and the reference signal is detected and the first correlation value is derived from the first correlation. Second correlation is detected between the delayed version of the recovered signal and the reference signal and the second correlation value is derived therefrom. A selector is provided for selecting one of the outputs of the amplifier and the subtractor. A decision feedback equalizer operates on the output of the selector to produce a decision output and a decision error. The decision error is compared with a threshold value and the selector is controlled depending on whether the decision error is higher or lower than the threshold value.

According to a second aspect of the present invention, there is provided an interference canceler which comprises first and second diversity (either space or frequency) branches. Each of the diversity branches includes a first time-diversity branch including a first complex multiplier for multiplying a signal recovered from a quadrature modulated carrier by a first correlation value and a second time-diversity branch including a delay element and a second complex multiplier for multiplying a delayed version of the recovered signal by a second correlation value, an adder for additively combining output signals from the first and second complex multipliers, a subtractor for subtractively combining the output signals of the complex multipliers, an AGC amplifier which produces a first reference signal representative of the envelope of the output signal of the adder. Each diversity further includes a first correlator for detecting a correlation between the recovered signal and the first reference signal and deriving therefrom the first correlation value, and a second correlator for detecting a correlation between the delayed version of the recovered signal and the first reference signal and deriving therefrom the second correlation value, and a selector for selecting one of the outputs of the amplifier means and the subtractor. First and second adaptive matched filters are provided for respectively operating on the output signals of the selectors of the first and second diversity branches using a second reference signal and producing matched filter output signals which are matched in phase with each other. The outputs of the matched filters are maximal-ratio combined in a combiner and supplied to a decision feedback equalizer for operating on the combined output signal to produce a decision output and a decision error. The decision output is applied to the first and second adaptive matched filters as the second reference signal. The decision error is compared with a threshold value and the selectors of the first and second diversity branches are controlled depending on whether the decision error is higher or lower than the threshold value.

BRIEF DESCRIPTION OF THE DRAWINGS

The present invention will be described in further detail with reference to the accompanying drawings, in which.

DETAILED DESCRIPTION

Figure 1:
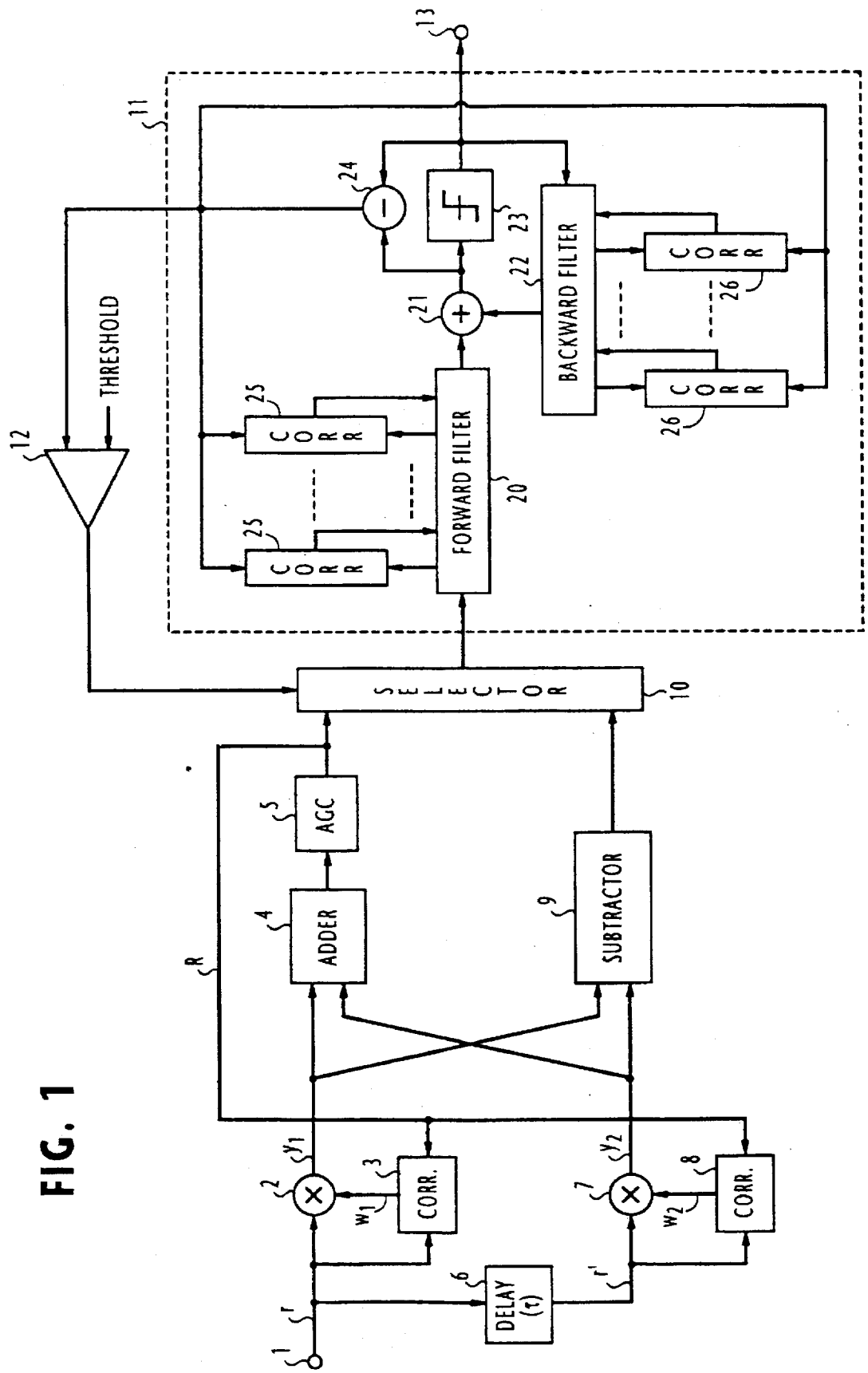
FIG. 1 is a block diagram of an interference canceler according to a first embodiment of the present invention.

In FIG. 1, there is shown a DFE (decision-feedback equalizer) interference canceler according to an embodiment of the present invent ion. The DFE interference canceler has two time-diversity branches connected to a common input terminal 1 to receive the baseband signal r of a quadrature modulated carrier is applied. The first time-diversity branch is formed by a complex multiplier 2 and the second time-diversity branch is formed by a series circuit of a delay element 6 for providing a time delay τ and a complex multiplier 7. The outputs of the first and second time-diversity branches are combined by an adder 4 and the difference between them is detected by a subtractor 9. The output of adder 4 is applied to an automatic gain-controlled (AGC) amplifier 5 to produce an amplified signal which is normalized with respect to the envelope of a maximal-ratio combined signal.

The output of AGC amplifier 5 is applied to correlators 3 and 8 as a reference signal R. Correlation between the baseband input signal at terminal 1 and the reference signal R is detected by correlator 3 by multiplying it by the complex conjugate of the input signal and taking an average value of the resultant products over a specified period of time to produce a weighting factor $w_1$. The output signal $w_1$ of the correlator 3 is supplied to complex multiplier 2 where it is complex-multiplied by the input signal r. Likewise, correlation between the delayed input signal from delay element 6 and the reference signal is taken by correlator 8 by multiplying it by the complex conjugate of the delayed signal r' and taking an average value of the resultant products over the specified time period to produce a weighting factor $w_2$. The output signal $w_2$ of the correlator 8 is supplied to multiplier 7 where it is complex-multiplied by the delayed signal r'. The time taken to produce a time-average value of each of the correlators 2 and 7 is much longer than the symbol interval of the input signal but much shorter than the interval at which fading usually occurs.

The outputs of AGC amplifier 5 and subtractor 9 are selectively connected through a selector 10 to a decision-feedback equalizer 11 whose decision output is supplied to the output terminal 13 of the interference canceler. A comparator 12 which compares a decision error signal of the equalizer 11 with a predetermined threshold supplies a control signal to selector 10. When the decision error is lower than the threshold, the output of the AGC amplifier is applied to the decision feedback equalizer 11. Otherwise, the output of subtractor 9 is applied to the equalizer 11.

Initially, the selector 10 is in the upper position for coupling the output of AGC amplifier 5 to the decision feedback equalizer 11. The selector 5 will remains in the upper position if the level of narrowband CW interference is low and consequently the decision error is lower than the threshold of the comparator 12 and intersymbol interference is canceled in the DFE 11, producing a replica of the desired baseband signal S at the output terminal 13.

It is sufficient to examine the present invention in a quantitative terms as follows.

The input signal at terminal 1 is represented as:

$$r=hS+gJ \tag{1}$$

where, h is the impulse response of the desired channel and g is the impulse response of the interfering channel. The output signal r' of delay element 6 is thus given by:

$$r'=hS \cdot exp(j\omega_s\tau)+gJ \cdot exp(j\omega_j\rho) \tag{2}$$

where $\omega_s$ and $\omega_j$ are the carrier frequencies of the desired and undesired signals, respectively. The output signals $y_1$ and $y_2$ of the complex multipliers 2 and 7 are in the form:

$$y_1=w_1 \cdot r=w_1(hS+gJ) \tag{3}$$

$$y_2=w_2 \cdot r'=w_2\{hS \cdot exp(j\omega_s\tau)+gJ \cdot exp(j\omega_j\tau)\} \tag{4}$$

Thus, the output signal $y_3$ of time-diversity combiner 4 is represented by:

$$\begin{aligned} y_3 &= y_1+y_2 \\ &= \{w_1+w_2 \cdot exp(j\omega_s\tau)\}hS+\{w_1+w_2 \cdot exp(j\omega_j\tau)\}gJ \end{aligned} \tag{5}$$

Since the level of CW interference is higher than that of the desired signal.

If the interference becomes much stronger than the desired signal S so that the resultant decision error of the DFE 11 becomes higher than the threshold of comparator 12, the selector 10 is switched to the lower position, coupling the output of the subtractor 9 to the DFE 11. In this case, the reference signal R from the AGC amplifier 5 represents the interference (jamming) signal J and the weighting factors $w_1$ and $w_2$ are represented as follows:

$$\begin{aligned} w_1 &= E[r^* \cdot R]=E[\{hS+gJ\}^* \cdot J] \\ &= E[(hS)^* \cdot J] \cdot E[(gJ)^* \cdot J] \end{aligned} \tag{6}$$

$$\begin{aligned} w_2 &= E[r'^* \cdot R] \\ &= E[(hS)^* \cdot exp(j\omega_s\tau)+gJ \cdot exp(j\omega_j\tau)\}^* \cdot J] \\ &= E[(hS)^* \cdot exp(-j\omega_s\tau) \cdot J]+E[(gJ)^* \cdot exp(-j\omega_j\tau) \cdot J] \end{aligned} \tag{7}$$

where * represents complex conjugate and E is the expected value representing the time averaging process. In this case, the autocorrelation coefficient of the symbols of the desired signal is given by $E[S_i^* \cdot S_j]$ which is equal to the Kronecker's delta function $\delta_{ij}$, where $\delta_{ij}$ equals 1 if i=j and 0 if i≠j. As a result, Equations (6) and (7) are rewritten as:

$$w_1=g^* \cdot E[J^* \cdot J]=g^* \tag{8}$$

$$w_2=g^* exp(-j\omega_j\tau) \cdot E[J^* \cdot J]=g^* \, exp(-j\omega_j\tau) \tag{9}$$

Thus, the outputs of complex multipliers 2 and 7 are obtained as follows by rewriting Equations (3) and (4):

$$y_1=g^* \, hS+g^* \, gJ \tag{10}$$

$$y_2=g^* \, hS \cdot exp\{(\omega_s-\omega_j)\tau\}+g^* \, gJ \tag{11}$$

It can be seen from Equations (11) and (12) that the interference components J are aligned in phase to each other at the outputs of complex multipliers 2 and 7 and their magnitudes are multiplied by a factor $g^* \cdot g$ which is a real number in the dimension of power. Thus, the strong interference components J of the first and second time-diversity branches are canceled with each other at the output of subtractor 9. When this interference cancellation occurs at frequency $\omega_j$, there is a corresponding notch at the output of the subtractor 9 in the spectrum of the desired signal. This spectral notch can be considered to be analogous to the spectral notch caused by a deep fade in a multipath fading channel. Therefore, the spectral notch of the desired signal is equalized by the DFE 11. Since the decision error does not contribute to this interference cancellation, the interference canceler of the present invention operates with a high convergence speed.

When the desired signal becomes stronger than the interference, the decision error at DFE 11 will reduce below the comparator's threshold, the selector 10 is switched from the output of subtractor 9 to the output of AGC amplifier 5. In this case, the interference components J of both time-diversity branches are combined in the adder 4. However, the DFE 11 plays an important role in canceling the interference.

When the desired signal S is stronger than the interference J and consequently the DFE 11 is receiving the output of AGC amplifier 5, the reference signal R from this amplifier represents the desired signal. In this case, the desired components S of the time-diversity branches are aligned in phase to each other at the outputs of complex multipliers 2 and 7 and their magnitudes are multiplied by the power-dimension factor $g^* \cdot g$. Thus, the desired signal components S of both time-diversity branches are maximal-ratio combined in the adder 4.

Decision feedback equalizer 11 comprises a forward filter 20, an adder 21, a backward filter 22, a decision circuit 23 and a decision error detector 24. Each of the forward and backward filters is a transversal filter formed by a tapped delay line, and a plurality of tap-weight multipliers connected to the taps of the delay line for weighting the tap signal with corresponding tap-weight coefficients. The weighted tap signals are summed in an adder, producing an output of the filter.

Note that the reference tap of the forward filter 20 is located at the center of the tapped delay line of this forward filter for canceling combined interference components when the desired signal is stronger than the interference.

The input of the tapped delay line of forward filter 20 is connected to the output of selector 10 and the output of forward filter 20 is connected to adder 21 where it is combined with the output of backward filter 22. The output of adder 21 is used by the decision circuit 23 to produce a decision output which is coupled to the output terminal 13 and to the input of the tapped delay line of backward filter 22. The decision error detector 24 which is connected across the input and output of decision circuit 23 produces a decision error. This decision error is supplied to correlators 25 and 26 as well as to comparator 12. To produce tap-weight coefficients for the forward filter, correlations between the tap signals of this filter and the decision error are detected by correlators 25 and supplied to the corresponding tap-weight multipliers of the forward filter. In a similar manner, correlations between the tap signals of the backward filter 22 and the decision error are detected by correlators 26 and respectively supplied to the corresponding tap-weight multipliers of the backward filter.

When the interference is stronger than the desired signal, the backward filter 22 plays an important role in compensating for the spectral notch created in the desired signal.

The tap-weight coefficients Of both forward and backward filters are updated according to the minimum mean square error (MMSE) algorithm and the decision error is reduced to a minimum.

Figure 2:
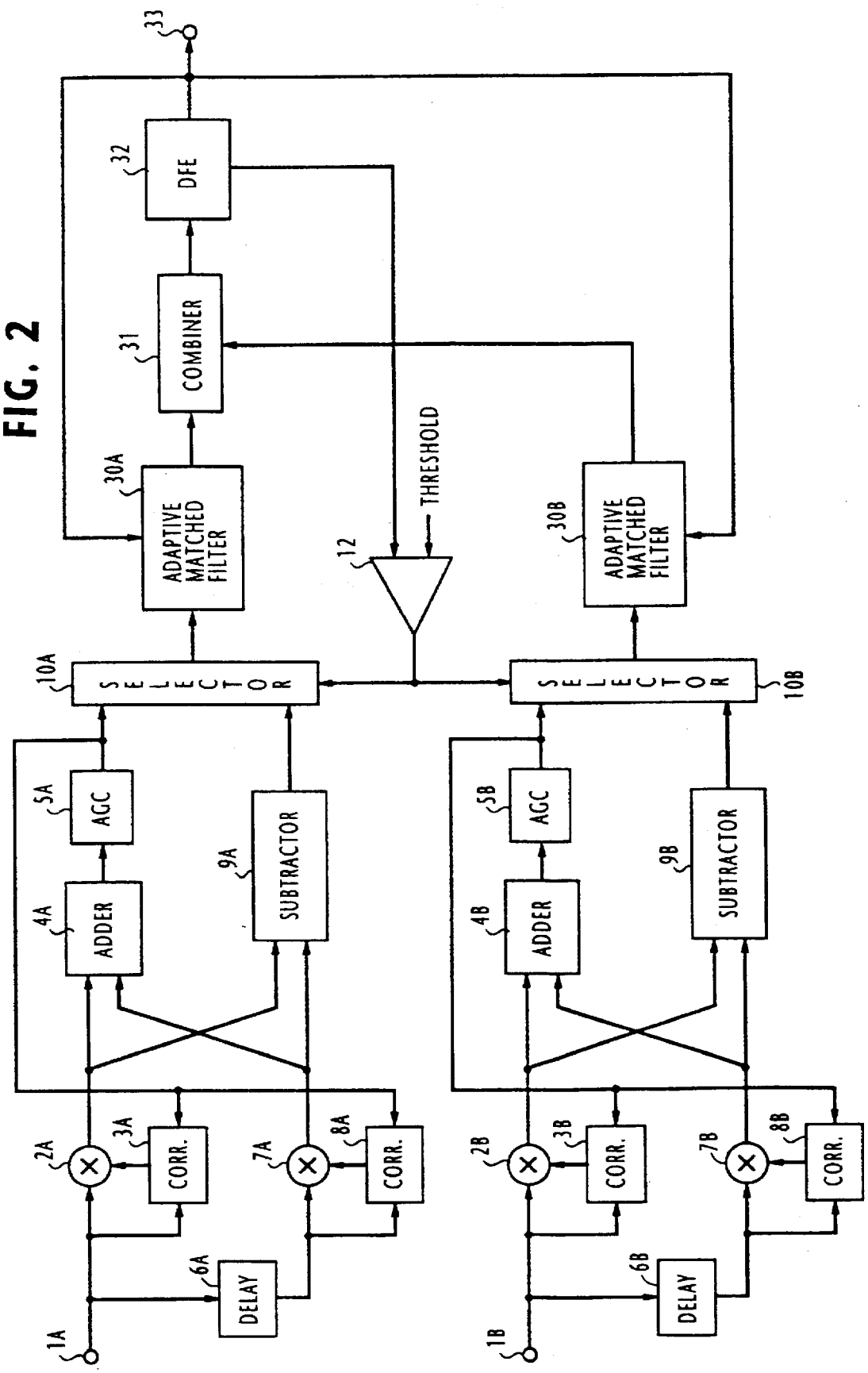
FIG. 2 is a block diagram of an interference canceler having two space or frequency diversity branches according to a second embodiment of the present invention.

The embodiment of FIG. 1 can be used to form a diversity DFE interference canceler having a plurality of space or frequency diversity branches. In FIG. 2, a DFE interference canceller having two diversity branches is illustrated. The diversity branches A and B have respective input terminals 1A and 1B. They are constructed by the same circuit elements as those used in FIG. 1 and marked by the same numerals as those used in FIG. 1 plus A and B. The operation of each diversity branch is identical to that of the previous embodiment.

The outputs of selectors 10A and 10B are connected respectively to adaptive matched filters 30A and 30B, the outputs of which are connected to a combiner 31 for maximal-ratio combining. Decision feedback equalizer 32 identical to the DFE of the previous embodiment receives the output of combiner 31 to produce an equalized signal to supply its decision error to the comparator 12 and its decision output to the output terminal 33 of the interference canceler. The output of DFE 32 is further supplied to adaptive matched Filters 30A and 30B. Each of the matched filters 30A, 30B is a transversal filter having a tapped delay line, a plurality of tap-weight multipliers connected to the taps of the delay line and a plurality of correlators. The output of DFE 32 is used in the match filters to detect correlations with their tap signals and the coefficients of their tap-weight multipliers are controlled with the detected correlations. In this manner, the output signals of both diversity branches from selectors 10A and 10B are matched in phase with each other at the outputs of matched filters 30A and 30B and the amplitudes of the matched filter outputs are equal to the squared value of their diversity signals from the corresponding selectors. Therefore, the signal-to-noise ratios of the outputs of matched filters 30A and 30B are both maximized at the inputs of combiner 31, thus achieving the maximal-ration combining. A high diversity gain can therefore be obtained.

As in the previous embodiment, the spectral notch in the desired signal produced as a result of interference cancellation in each space/frequency diversity branches can be compensated for by the decision feedback equalizer 32.

When the desired signal is stronger than either of the jamming signals detected by the respective diversity branches, they are combined in the adders 4A and 4B. To cancel these jamming components, it is required that the tap signal at the center (reference) tap of the forward filter of the decision feedback equalizer 32 be multiplied by a tap-weight multiplier according to the correlation between the reference tap signal and the decision error in the same manner as all the other tap signals are respectively multiplied by their correlations with the decision error. This is necessary for the multipath interference cancellation although this requirement is not necessary in the case of the first embodiment.

What is claimed is:

1. An interference canceler comprising:

a first time-diversity branch including a first complex multiplier for multiplying a signal recovered from a quadrature modulated carrier by a first correlation value;

a second time-diversity branch including a delay element for producing a delayed version of the recovered signal and a second complex multiplier for multiplying the delayed version of the recovered signal by a second correlation value;

an adder for additively combining output signals from the first and second complex multipliers;

a subtractor for subtractively combining the output signals of said complex multipliers;

amplifier means for producing a reference signal representative of an envelope of the output signal of the adder;

a first correlator for detecting a correlation between the recovered signal and the reference signal and deriving therefrom said first correlation value;

a second correlator for detecting a correlation between the delayed version of the recovered signal and the reference signal and deriving therefrom said second correlation value;

a selector for selecting one of the outputs of the amplifier means and the subtractor;

a decision feedback equalizer for operating on the output signal selected by the selector to produce a decision output and a decision error; and a comparator for comparing the decision error with a threshold value and controlling said selector depending on whether the decision error is higher or lower than the threshold value.

2. An interference canceler as claimed in claim 1, wherein said decision feedback equalizer comprises:

a forward filter having a tapped delay line for receiving the output signal of the selector, a plurality of multipliers for weighting tap signals on the delay line by respective tap-weight coefficients, and an adder for summing the weighted tap signals to produce an output signal of the forward filter, said tapped delay line has a reference tap located at the center of the delay line;

a backward filter having a tapped delay line for receiving the decision output, a plurality of multipliers for weighting tap signals on the delay line by respective tap-weight coefficients, and an adder for summing the weighted tap signals to produce an output signal of the backward filter;

a combiner for combining the output signals of the forward and backward filters;

a decision circuit connected to the output of the combiner for producing said decision output;

an error detector connected to the input and output of the decision circuit for producing said decision error; and a plurality of first correlators for detecting correlations between the decision error and the tap signals of the forward filter and deriving therefrom the tap weight coefficients of the forward filter and a plurality of second correlators for detecting correlations between the decision error and the tap signals of the backward filter and deriving therefrom the tap weight coefficients of the backward filter.

3. An interference canceler comprising:

first and second diversity branches, each of the diversity branches including:

a first time-diversity branch inducting a first complex multiplier for multiplying a signal recovered from a quadrature modulated carrier by a first correlation value;

a second time-diversity branch including a delay element for producing a delayed version of the recovered signal and a second complex multiplier for multiplying the delayed version of the recovered signal by a second correlation value;

an adder for additively combining output signals from the first and second complex multipliers;

a subtractor for subtractively combining the output signals of said complex multipliers;

amplifier means for producing a first reference signal representative of an envelope of the output signal of the adder;

a first correlator for detecting a correlation between the recovered signal and the first reference signal and deriving therefrom said first correlation value;

a second correlator for detecting a correlation between the delayed version of the recovered signal and the first reference signal and deriving therefrom said second correlation value; and a selector for selecting one of the outputs of the amplifier means and the subtractor;

first and second adaptive matched filters for respectively operating on the output signals of the selectors of the first and second diversity branches using a second reference signal and producing matched filter output signals which are matched in phase with each other;

a combiner for combining the matched filter output signals to produce a combined output signal;

a decision feedback equalizer for operating on the combined output signal to produce a decision output and a decision error and applying the decision output to the first and second adaptive matched filters as said second reference signal; and a comparator for comparing the decision error with a threshold value and controlling the selectors of the first and second diversity branches depending on whether the decision error is higher or lower than the threshold value.

4. An interference canceler as claimed in claim 3, wherein said decision feedback equalizer comprises:

a forward filter having a tapped delay line for receiving the combined output signal of the combiner, a plurality of multipliers for weighting tap signals on the delay line by respective tap-weight coefficients, and an adder for summing the weighted tap signals to produce an output signal of the forward filter, said tapped delay line has a reference tap located at the center of the delay line;

a backward filter having a tapped delay line for receiving the decision output, a plurality of multipliers for weighting tap signals on the delay line by respective tap-weight coefficients, and an adder for summing the weighted tap signals to produce an output signal of the backward filter;

a combiner for combining the output signals of the forward and backward filters;

a decision circuit connected to the output of the combiner for producing said decision output;

an error detector connected to the input and output of the decision circuit for producing said decision error; and a plurality of first correlators for detecting correlations between the decision error and the tap signals of the forward filter and deriving therefrom the tap weight coefficients of the forward filter, and a plurality of second correlators for detecting correlations between the decision error and the tap signals of the backward filter and deriving therefrom the tap weight coefficients of the backward filter.

* * * * *